United States Patent
Samata et al.

(10) Patent No.: US 7,065,469 B2
(45) Date of Patent: Jun. 20, 2006

(54) MANUFACTURING APPARATUS AND METHOD FOR PREDICTING LIFE OF A MANUFACTURING APPARATUS WHICH USES A ROTARY MACHINE

(75) Inventors: Shuichi Samata, Yokohama (JP); Takeo Furuhata, Yokkaichi (JP); Yukihiro Ushiku, Yokohama (JP); Akihito Yamamoto, Yokohama (JP); Takashi Nakao, Danbury, CT (US)

(73) Assignee: Kabushiki Kaisha Toshiba, Tokyo (JP)

( * ) Notice: Subject to any disclaimer, the term of this patent is extended or adjusted under 35 U.S.C. 154(b) by 32 days.

(21) Appl. No.: 10/390,698

(22) Filed: Mar. 19, 2003

(65) Prior Publication Data
US 2004/0064277 A1 Apr. 1, 2004

(30) Foreign Application Priority Data
Sep. 27, 2002 (JP) ............................ P2002-282813

(51) Int. Cl.
*G01M 7/02* (2006.01)
(52) U.S. Cl. .................. 702/183; 702/34; 702/56; 702/76; 73/1.84; 73/660
(58) Field of Classification Search ........ 702/182–185, 702/33–36, 56–59, 66, 70–72, 75–77; 73/1.14, 73/1.84, 54.28, 660, 672
See application file for complete search history.

(56) References Cited

U.S. PATENT DOCUMENTS

| | | | | |
|---|---|---|---|---|
| 3,617,020 A | * | 11/1971 | Gerstine et al. | 244/17.27 |
| 4,273,515 A | * | 6/1981 | Fitch | 417/62 |
| 4,607,529 A | * | 8/1986 | Morey | 73/660 |
| 5,352,090 A | * | 10/1994 | Churchill et al. | 416/61 |
| 5,582,085 A | * | 12/1996 | Ellis | 82/118 |
| 5,995,632 A | * | 11/1999 | Okada | 381/71.3 |
| 6,297,742 B1 | * | 10/2001 | Canada et al. | 340/635 |
| 6,345,951 B1 | * | 2/2002 | Choi | 415/1 |
| 6,438,440 B1 | * | 8/2002 | Hayashi | 700/121 |
| 6,494,680 B1 | * | 12/2002 | Cardin | 416/145 |
| 6,980,910 B1 | * | 12/2005 | Shen et al. | 702/56 |
| 2002/0124692 A1 | * | 9/2002 | Newell et al. | 82/1.11 |
| 2003/0106375 A1 | * | 6/2003 | Sabini et al. | 73/593 |
| 2004/0030419 A1 | * | 2/2004 | Miyasaka et al. | 700/32 |

(Continued)

FOREIGN PATENT DOCUMENTS

JP  11-62846  3/1999

(Continued)

OTHER PUBLICATIONS

U.S. Appl. No. 60/339,042, filed Dec. 7, 2001, Jarrell et al.*

(Continued)

*Primary Examiner*—Marc S. Hoff
*Assistant Examiner*—Jeffrey R West
(74) *Attorney, Agent, or Firm*—Finnegan, Henderson, Farabow, Garrett & Dunner, L.L.P.

(57) ABSTRACT

A manufacturing apparatus which includes a rotary machine, includes: a plurality of accelerometers configured to measure diagnosis time series data attached to the rotary machine at locations where variations of the rotary machine are different; a frequency analysis device configured to perform a frequency analysis on the diagnosis time series data measured by the plurality of accelerometers; a time series data recording module configured to generate diagnosis data based on variations in characteristics of vibration corresponding to an analysis target frequency and to record the diagnosis data; and a life prediction unit configured to analyze the diagnosis data to determine a life span of the rotary machine.

16 Claims, 10 Drawing Sheets

U.S. PATENT DOCUMENTS

2004/0030524 A1 * 2/2004 Jarrell et al. ................ 702/113

FOREIGN PATENT DOCUMENTS

| JP | 2000-64964 | | 3/2000 |
|---|---|---|---|
| JP | 2000-110735 | | 4/2000 |
| JP | 2000-259222 | | 9/2000 |
| JP | 2001-330510 | | 11/2001 |
| JP | 2001330510 | A * | 11/2001 |

OTHER PUBLICATIONS

U.S. Patent Application for Shuichi Samata et al., U.S. Appl. No. 10/229,005, filed Aug. 28, 2002.

U.S. Patent Application for Yukihiro Ushiku et al., U.S. Appl. No. 10/101,720, filed Mar. 21, 2002.

U.S. Patent Application for Shuichi Samata et al., U.S. Appl. No. 10/228,111, filed Aug. 27, 2002.

Notice of Grounds for Rejection issued by the Taiwanese Patent Office, dated Apr. 27, 2005, for Taiwanese Patent Application Serial No. 092126380, and English and Japanese translation thereof.

Notification of the First Office Action, dated Jun. 24, 2005, for PRC Patent Application Serial No. 03160083.2, and English translation thereof.

* cited by examiner

MANUFACTURING APPARATUS AND METHOD FOR PREDICTING LIFE OF A MANUFACTURING APPARATUS WHICH USES A ROTARY MACHINE

CROSS REFERENCE TO RELATED APPLICATIONS

This application is based upon and claims the benefit of priority from prior Japanese Patent Application P2002-282813 filed on Sep. 27, 2002; the entire contents of which are incorporated by reference herein.

BACKGROUND OF THE INVENTION

1. Field of the Invention

The present invention relates to prediction and diagnostic techniques relating to the life span of a manufacturing apparatus using a rotary machine. In particular, it relates to a method for predicting the life span of a rotary machine such as a dry pump and a manufacturing apparatus including the rotary machine.

2. Description of the Related Art

Failure diagnosis has become important to ensure efficient semiconductor device manufacturing. In recent years, especially as the trend towards small volume production of many different items of system LSI increases, an efficient yet highly adaptable semiconductor device manufacturing method has become necessary. It is possible to use a plurality of small-scale production lines adapted for miscellaneous purposes in view of the efficient production of different semiconductor devices. However, if many small-scale production lines are constructed by merely miniaturizing large-scale production lines, investment efficiency may be reduced due to a decrease in the rate of manufacturing apparatus utilization. To rectify this situation, there is a method whereby different manufacturing processes are performed by one piece of manufacturing equipment. For example, in a LPCVD apparatus using a dry pump for the evacuation system, reactive gases and reaction products differ and formation situations for the reaction products within the dry pump differ depending on the type of manufacturing processes. Therefore, the manufacturing process affects the life of the dry pump.

If the dry pump should have a failure during a specific manufacturing process, then the lot products being processed will be defective. Moreover, excessive maintenance of the manufacturing apparatus may become necessary due to microscopic dust caused by residual reactive gases within the manufacturing apparatus. Implementation of such excessive maintenance causes the manufacturing efficiency of the semiconductor device to drop dramatically. If regular maintenance is scheduled with a margin of safety in order to prevent such sudden failures during the manufacturing process, the frequency of maintenance work on the dry pump may become astronomical. Not only does this increase maintenance costs, but also the decrease in availability of the semiconductor manufacturing apparatus is conspicuous due to changing the dry pump, which causes the manufacturing efficiency of the semiconductor device to decline sharply. In order to use a common semiconductor manufacturing apparatus for a plurality of processes, as is necessary for an efficient small-scale production line, it is desirable to accurately diagnose vacuum pump life and to operate the dry pump without having any waste in terms of time.

Previously, some methods of diagnosing dry pump life have been proposed. Basically, a state of the dry pump may be monitored by characteristics such as the motor current, vibration, and temperature, and methods have been provided to predict the pump life from changes in these characteristics. In particular, dry pump life span diagnosis methods have mainly been provided by monitoring the state of the dry pump through vibrations caused by the rotation of a rotor. Since a diagnosis using the vibration can be accomplished through measurements taken by merely attaching an accelerometer to a side of the dry pump, it has gained attention as a simple and easy method for predicting pump life span. In addition, as a method for predicting life span through measured vibration data, there has been proposed a method where deviation from a reference value for a high frequency component near 300 Hz is analyzed using neural networks (refer to Japanese Patent Application P2000-64964).

In the case of the technology disclosed in Japanese Patent Application P2000-64964, since a targeted frequency is high, changes accompanying pump operation, such as reaction product blockage may broaden the frequency spectrum, leading to a problem of decreased sensitivity.

In the case of calculating life prediction by monitoring transitions in a motor current of the dry pump, sensitive, accurate and stable life prediction is difficult because of variations in process conditions such as gas flow, or power supply.

Furthermore, when an accelerometer is attached to the dry pump, sensitivity changes depending on where and how it is attached, and a collection of highly sensitive and stable vibration data is difficult. Especially, the accelerometer is vulnerable to noise such as vibrations of other work in the vicinity of the semiconductor manufacturing apparatus, or changes of an inner pressure of the dry pump. Therefore, a variation of the observed vibration is desired to distinguish whether the observed or monitored vibration is a noise.

SUMMARY OF THE INVENTION

A first aspect of the present invention inheres in a manufacturing apparatus which includes a rotary machine, includes: a plurality of accelerometers configured to measure diagnosis time series data attached to the rotary machine at locations where variations of the rotary machine are different; a frequency analysis device configured to perform a frequency analysis on the diagnosis time series data measured by the plurality of accelerometers; a time series data recording module configured to generate diagnosis data based on variations in characteristics of vibration corresponding to an analysis target frequency and to record the diagnosis data; and a life prediction unit configured to analyze the diagnosis data to determine a life span of the rotary machine.

A second aspect of the present invention inheres in a method for predicting the life of a manufacturing apparatus which includes a rotary machine, includes: measuring diagnosis of the rotary machine in a plurality of locations where phases of vibrations are different; generating diagnosis data based on variations in characteristics of the vibrations corresponding to an analysis target frequency by performing a frequency analysis for the diagnosis time series data; and determining a life span of the rotary machine using the diagnosis data.

DETAILED DESCRIPTION OF THE INVENTION

Figure 1:
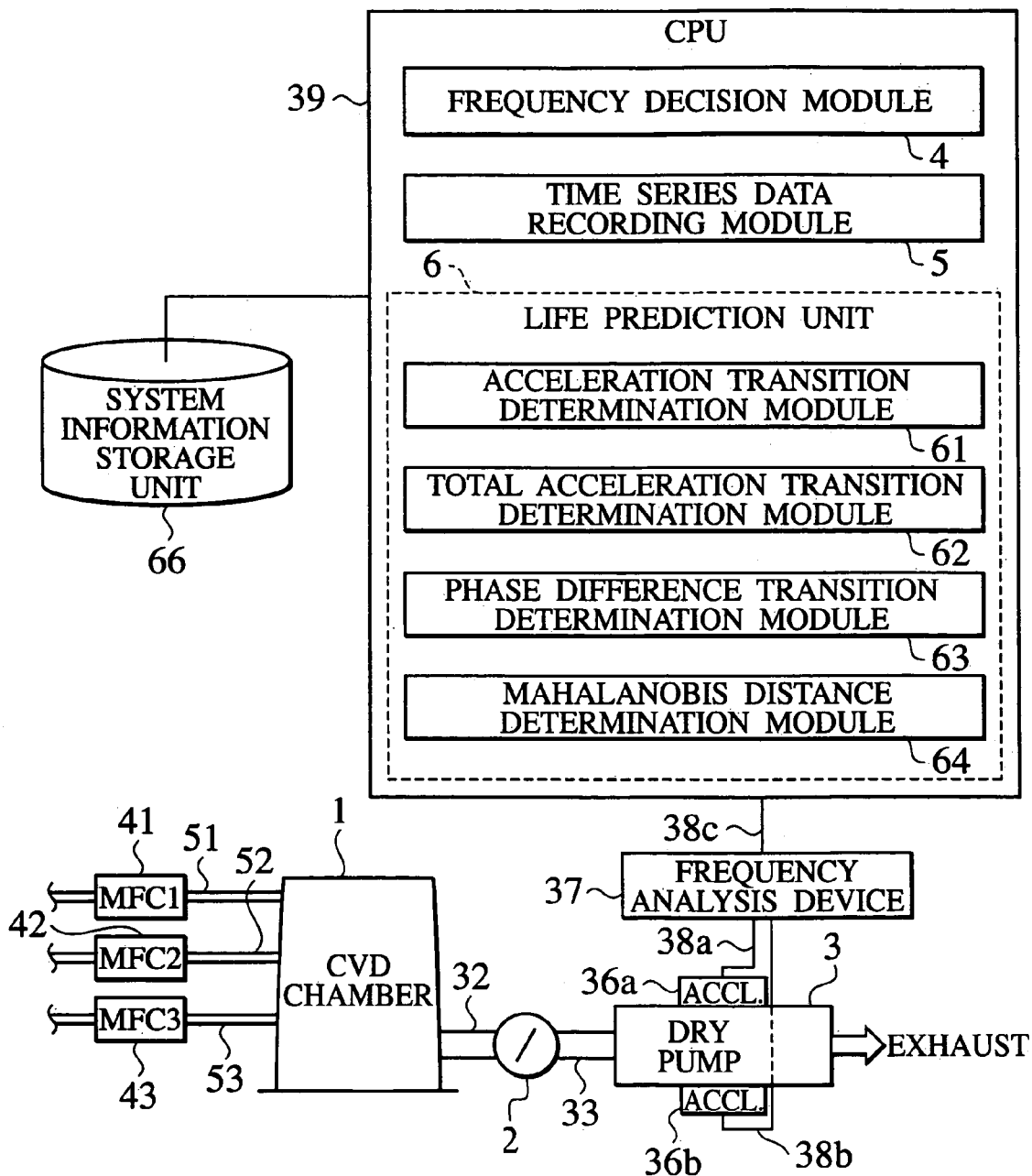
FIG. 1 is a schematic diagram of a semiconductor manufacturing apparatus according to embodiments of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First Embodiment

A low-pressure chemical vapor deposition (LPCVD) apparatus as a semiconductor manufacturing apparatus according to a first embodiment of the present invention, as shown in FIG. 1, includes a dry pump 3 as a rotary machine for evacuating a CVD chamber 1, accelerometers 36a and 36b for detecting vibrations located on side surfaces of the dry pump 3, a frequency analysis device 37 analyzing time series data of the vibration detected by the accelerometers 36a, 36b and a central processing unit (CPU) 39 predicting a life of the dry pump 3 based on the frequency analyzed time series data.

In the LPCVD apparatus, gas conduits 51, 52, and 53 are connected to a CVD chamber 1. These gas conduits 51, 52, and 53 are connected to mass flow controllers 41, 42, and 43, respectively, which control various source gases and carrier gas introduced into the CVD chamber 1. More specifically, source gases and the like having their flow controlled by mass flow controllers 41, 42, and 43 are introduced into the CVD chamber 1 under fixed low-pressure conditions via gas conduits 51, 52, and 53. The CVD chamber 1 has an airtight structure capable of shutting out outside air and maintaining an atmosphere therein. In order to evacuate the CVD chamber 1 using a dry pump 3, vacuum conduit 32 is connected to the exhaust side of the CVD chamber 1, and a gate valve 2 is connected to the exhaust side of the vacuum conduit 32. Another vacuum conduit 33 is further connected to the exhaust side of the gate valve 2. The suction side of the dry pump 3 is connected to the exhaust side of the vacuum conduit 33. The gate valve 2 separates the CVD chamber 1 and the dry pump 3 and adjusts exhaust gas flow, if necessary. In addition, the dry pump 3 is used for evacuating non-reactant source gases and reaction products introduced into the CVD chamber 1.

For example, in the case of depositing a silicon nitride ($Si_3N_4$) film using the LPCVD apparatus shown in FIG. 1, dichlorosilane ($SiH_2Cl_2$) gas and ammonia ($NH_3$) gas are respectively introduced via the mass flow controllers 41 and 42 into the CVD chamber 1 under low-pressure conditions. Inside the CVD chamber 1, a silicon (Si) substrate is heated to approximately 800° C., and through the chemical reaction of the $SiH_2Cl_2$ gas and $NH_3$ gas, a $Si_3N_4$ film is deposited upon the silicon substrate. In addition to generating the $Si_3N_4$ film, this reaction produces reaction by-products of ammonium chloride ($NH_4Cl$) gas and hydrogen ($H_2$) gas. Since $H_2$ is a vapor, it can be evacuated through the dry pump 3. On the other hand, since the temperature of the silicon substrate within the reactor is approximately 800° C. and it is under a low-pressure of approximately several 100 Pa or less at the time of formation, the ammonium chloride is also in a vapor phase.

While it is omitted from the drawings, an LPCVD apparatus typically has a trap disposed between the CVD chamber 1 and the dry pump 3 for collecting solid reaction by-products. With this trap, it is impossible to completely collect the reaction by-product under low-pressure conditions. The reaction by-product that is not collected reaches the dry pump 3. Pressure in the dry pump 3 increases from approximately 0.1 Pa to normal atmospheric pressure due to the compression of the gas. The reaction by-product being in a vapor phase under low-pressure conditions begins to solidify in accordance with the sublimation curve of the phase diagram as pressure increases. Within the dry pump 3, since the pressure changes from several 100 Pa of pressure to normal atmospheric pressure by repeating compression of the gas, the gaseous reaction by-product within the exhaust gas begins to solidify in the dry pump 3 as the pressure increases. If solidification begins in the conduit of the dry pump 3, although it is a minute amount, the deposited material causes elastic deformation of a rotational axis of the dry pump 3. This effect results in dry pump failure.

The Roots-type dry pump (rotary machine) 3 used in the LPCVD apparatus according to the first embodiment of the present invention, as shown in FIG. 1, includes the accelerometers 36a, 36b for detecting vibration. The accelerometers 36a, 36b are attached to a first (front) surface and a second (rear) surface facing to the first surface of the dry pump 3. Alternatively, the accelerometers 36a, 36b may be located on a top surface and a bottom surface of the dry pump 3. Moreover, the frequency analysis device 37, such as a Fourier transform/analysis device, is connected to the output side of the accelerometers 36a, 36b. The frequency analysis device 37 subjects the vibration (acceleration) of the dry pump 3 that has been sampled and measured by the accelerometers 36a, 36b to a Fourier transform and decomposes the Fourier transform into frequency components. Accordingly, wirings 38a and 38b are provided for transmitting data measured by the accelerometers 36a, 36b to the Fourier transform device 37. The frequency spectrum data which the vibration (acceleration) time series data has been decomposed into frequency components by the frequency analysis device 37 is transmitted to the CPU 39 via the wiring 38c.

A frequency decision module 4, a time series data recording module 5, and a life prediction unit 6 are installed in the CPU 39. The frequency decision module 4 analyzes the frequency spectrum data transmitted to the CPU 39 and determines the frequency to be analyzed according to the frequency where a spectral peak is located. The time series data recording module 5 records the analysis target frequency component of the sampled and measured acceleration in a file in the main storage unit of the CPU or a system information storage unit 66. Namely, with the results of the frequency analysis of the frequency analysis device 37, variations in the peak value of acceleration corresponding to the analysis target frequency are used to generate reference diagnosis data from reference time series data and variations in the peak value are used to generate evaluation diagnosis data from evaluation time series data. The reference diagnosis data and the evaluation diagnosis data are recorded in the main storage unit or the system information storage unit 66.

With the life prediction unit 6, the data groups recorded by the time series data recording module 5 are read out and a life span is calculated for the dry pump 3.

More specifically, the life prediction unit 6 of the semiconductor manufacturing apparatus according to the first embodiment includes four modules: an acceleration transition determination module 61, a total acceleration transition determination module 62, a phase difference transition determination module 63, and a Mahalanobis distance (MD) determination module 64. The acceleration transition determination module 61 determines the life span of the dry pump 3 using variations in acceleration during a film deposition. The total acceleration transition determination module 62 calculates integration of the acceleration within an analyzing frequency range during a film deposition step and determines the life span of the dry pump 3. The phase difference transition determination module 63 calculates a phase difference in the vibration data during a film deposition step and determines the life span of the dry pump 3. The MD determination module 64 generates a reference space (Mahalanobis space) from the vibration data group which has been measured a predetermined number of days previously during the film deposition step, calculates the MD using this reference space, and determines the life span of the dry pump 3 with variations in the MD.

Figure 2:
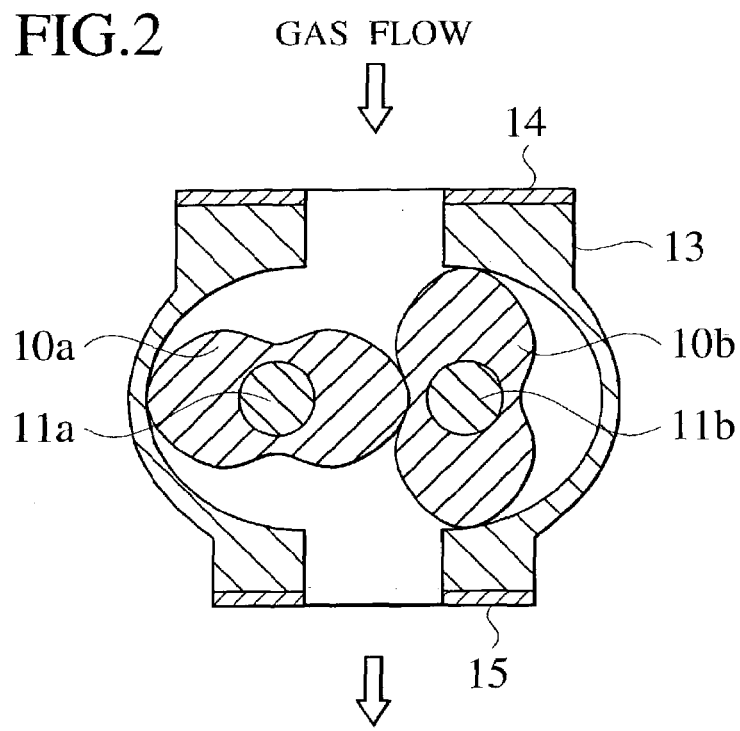
FIG. 2 is a cross-sectional diagram showing an internal configuration of a rotary machine as a dry pump shown in FIG. 1.

As shown in FIG. 2, the dry pump 3 used in the LPCVD apparatus according to the embodiment is constructed with two two-bladed rotors 10a and 10b, which rotate around rotational axes 11a and 11b, respectively. The dry pump 3 includes a body 13, a suction flange 14 provided on a suction side of the body 13, and an exhaust flange 15 provided on an exhaust side of the body 13. The gas flow coming from the CVD chamber 1 via the gate valve 2 enters the dry pump 3 through the suction flange 14. The gas that enters the dry pump 3 is compressed through the rotation of the two rotors 10a and 10b around the rotational axes 11a and 11b. The compressed gas is evacuated through the exhaust flange 15. Since the rotors 10a and 10b are rotated by a motor with a power supply frequency of 50 Hz, a frequency of a normal vibration measured by the accelerometers 36a, 36b is also 50 Hz.

Figure 3:
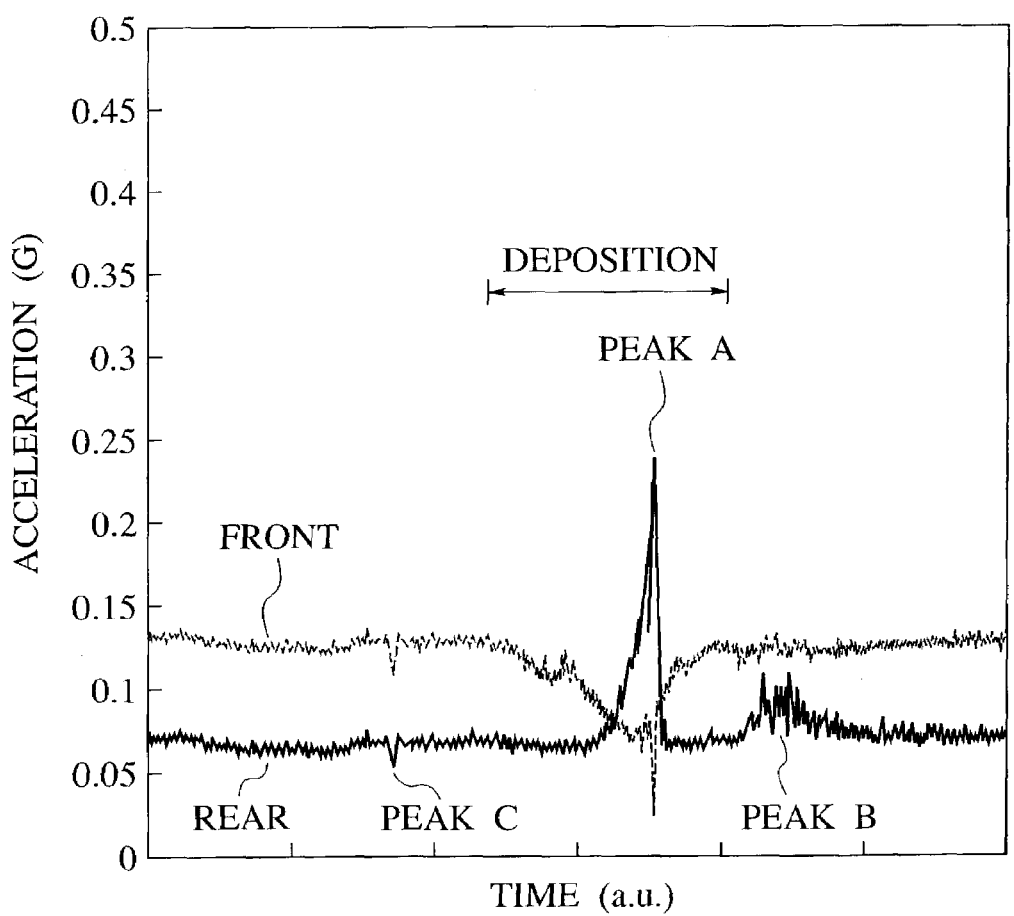
FIG. 3 is a graph showing the change over time of the peak acceleration during a film deposition step.

A variation over time of the acceleration of the normal vibration of 50 Hz during a film deposition step measured by the accelerometers 36a, 36b attached to the front surface and the rear surface of the dry pump 3 respectively, is shown in FIG. 3. Peaks A corresponds to changes of the acceleration during the film deposition step. In peaks A, the acceleration measured by the accelerometer 36a attached to the front surface of the dry pump 3 decreases, and the acceleration measured by the accelerometer 36b attached to the rear surface of the dry pump 3 increases. In addition, at a time other than the film deposition step, in peak B, the acceleration measured only by the accelerometer 36b increases, and in peak C, the acceleration measured by the accelerometers 36a, 36b decrease together. The acceleration peak measured by either of the accelerometers 36a or 36b, and the acceleration peaks increasing in an equivalent direction as measured by the accelerometers 36a and 36b, are noises caused by vibrations of work in the vicinity of the dry pump 3, or changes of an inner pressure of the dry pump 3, and not related to a blockage of the reaction by-product inside the dry pump 3. Therefore, it is possible to determine whether a variation of the acceleration is caused by a blockage of the reaction by-product inside the dry pump 3 or a noise, by comparing directions of the variations of the accelerations provided by the accelerometers 36a, 36b. Thus, peak acceleration caused by a blockage of the reaction by-product inside the dry pump 3 may be accurately and stably detected.

Figures 4, 5:
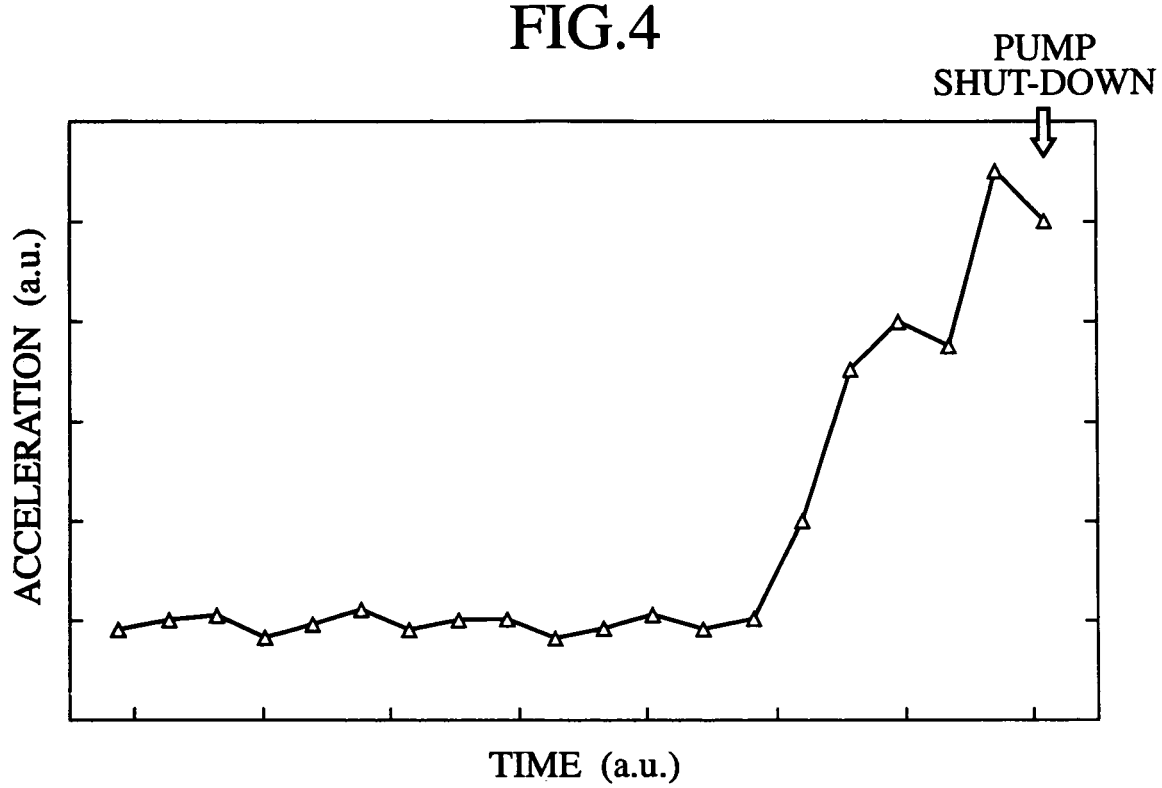
FIG. 4 is a graph showing the change over time of the peak acceleration decrease rate during a film deposition step.
FIG. 5 is a schematic illustration showing an arrangement of an accelerometer of a dry pump according to the embodiments of the present invention.

An example for a transition of the peak acceleration of the normal vibration of 50 Hz from just after exchange of the dry pump 3 to just before failure caused by a blockage of the reaction by-product inside the dry pump 3, is shown in FIG. 4. The peak acceleration suddenly increases just before shutdown of dry pump 3, whereby an indication for just before shutdown of the dry pump 3 can be detected. The life span of the dry pump 3 can be predicted with high sensitivity by using values of the peak acceleration corresponding to the analysis target frequency.

According to the life expectancy prediction of dry pump 3 of the first embodiment of the present invention, the variation in the acceleration of the normal vibration caused by a rotation of the rotors 10a, 10b is used. Since the rotors 10a, 10b are mechanically installed in the body 13, clearances between the rotors 10a and 10b, or between the rotors 10a, 10b and an inner wall of the body 13, are asymmetric in a strict sense. Consequently, the reaction by-products accumulated inside the dry pump 3 rub inhomogeneously between the rotors 10a and 10b, or between the rotors 10a, 10b and an inner wall of the body 13. When reaction by-products are accumulated, phases of the acceleration variation of vibration become reversed, depending on locations of the accelerometers 36a, 36b to the dry pump 3. For example, the locations of the accelerometers 36a, 36b in which the phases of the acceleration variation of the vibration become reversed, are the front surface and the rear surface of the dry pump 3, as shown in FIG. 1. Alternatively, even if the accelerometers 36c and 36d are attached in a location near a center and an end of the dry pump 3, as shown in FIG. 5, the phases of the acceleration variation of the vibration may become reversed.

Figure 6:
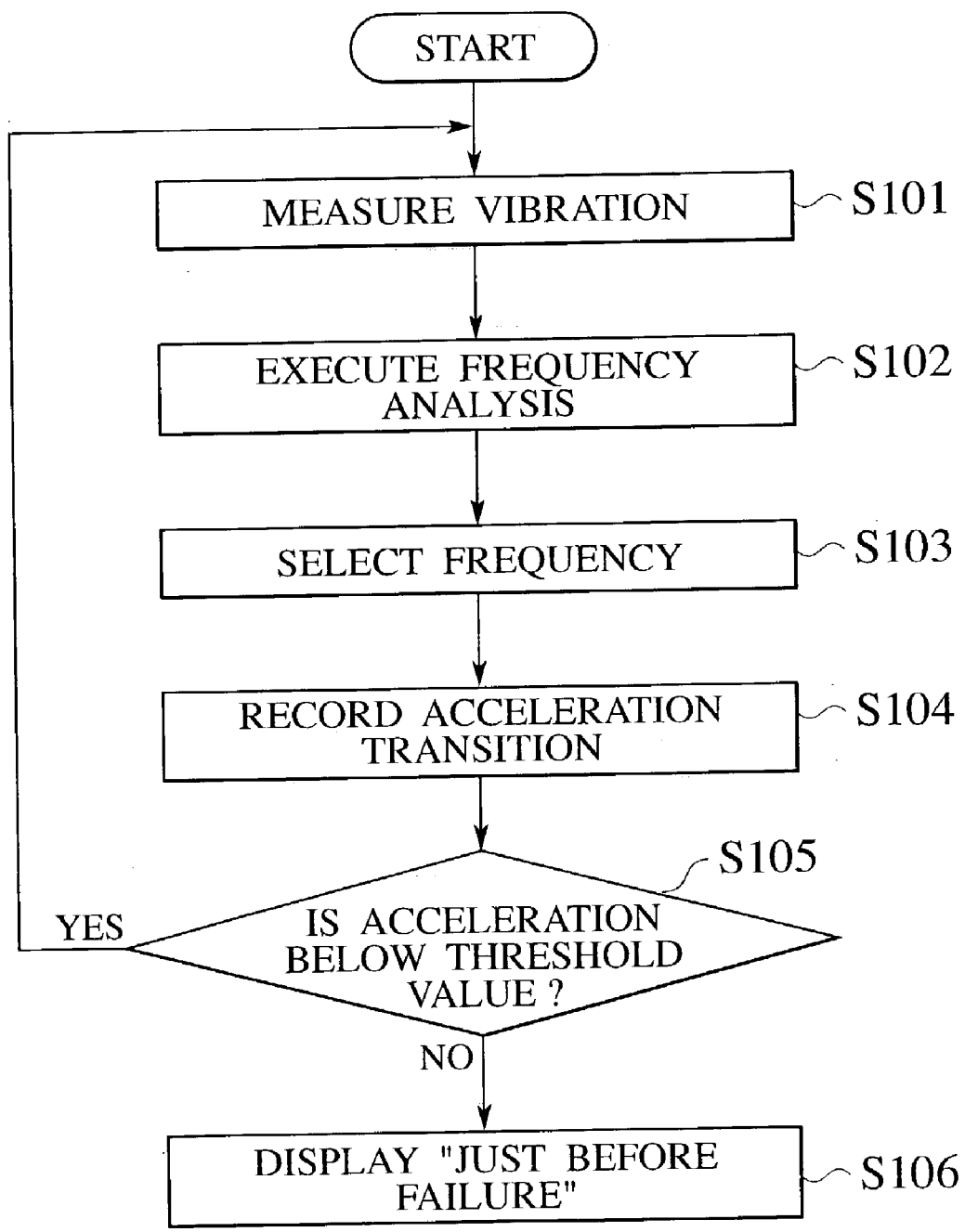
FIG. 6 is a flowchart for showing a life prediction method for a rotary machine used in the semiconductor manufacturing apparatus according to the first embodiment of the present invention.

Next, using the flowchart shown in FIG. 6, the life prediction method for the rotary machine used in the manufacturing apparatus according to the first embodiment of the present invention is described. More specifically, the life span is predicted for the dry pump 3 utilized in the LPCVD apparatus for depositing a $Si_3N_4$ film.

(a) To begin with, in step S101, the vibration (acceleration) time series data representing a transition of the dry pump 3 is sampled and measured by the accelerometers 36a, 36b located on the front surface and rear surface of the dry pump 3 of the LPCVD apparatus. For example, 4096 points of acceleration are sampled at intervals of 1 ms.

(b) Next in step S102, the vibration data obtained in step S101 is used to obtain an acceleration frequency spectrum, which is decomposed into frequency components by the frequency analysis device 37.

(c) In step S103, an analysis target frequency to be used for life span determination is determined considering the frequency spectrum for acceleration using the frequency decision module 4 of the CPU 39. With the first embodiment, the analysis target frequency is given as the normal vibration of 50 Hz.

(d) Thereafter, in step S104, using the time series data recording module 5, diagnosis data for evaluation including the analysis target frequency component of the peak acceleration are recorded in a file of the system information storage unit 66.

(e) In step S105, by reading out the diagnosis data for evaluation of the peak acceleration of the analysis target frequency component recorded in step S104, and comparing with a threshold value, the life span of the dry pump 3 is determined by the acceleration transition determination module 61. Measurement is repeated sequentially, if the diagnosis data are below the threshold.

(f) And if the diagnosis data for evaluation exceed the threshold, in step S106, the acceleration transition determination module 61 then displays an indication on a display device or display panel, or with a display lamp attached to the LPCVD apparatus showing "just before failure (life)".

In the life prediction method for a rotary machine used in a semiconductor manufacturing apparatus according to the first embodiment of the present invention, the "threshold" value for determining the indication of pump failure may be appropriately set in a real application, for example, with a variation of the peak acceleration deviated 1 to 3 times of an average value for the normal condition.

In the life prediction method for a rotary machine used in a semiconductor manufacturing apparatus according to the first embodiment of the present invention, the life prediction for the dry pump 3 is performed using the peak acceleration at the normal vibration of 50 Hz as the analysis target frequency. Alternatively, other vibration frequencies in which a variation of the peak acceleration is also observed may be used.

Figure 7:
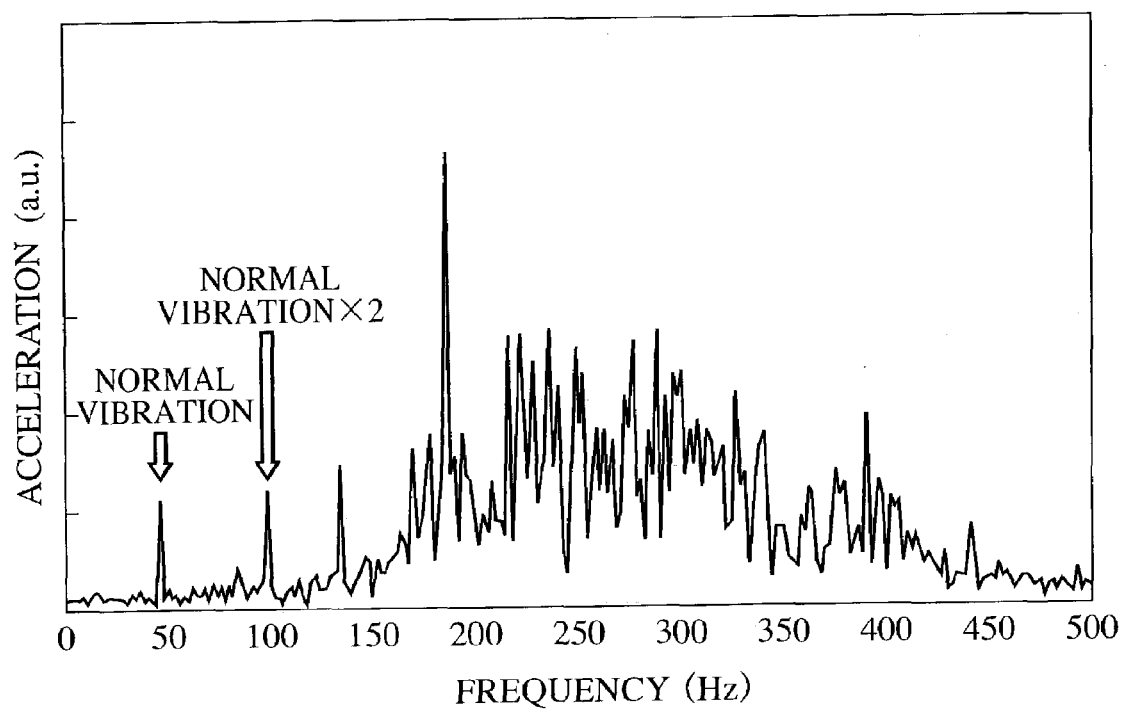
FIG. 7 is a graph showing the change over time of the peak acceleration during a film deposition step just after exchange of a dry pump.

A flow of gas is generated in the dry pump 3 by rotating plural rotors having plural blades around each of rotational axes of the rotors with a constant gap between the rotors. Thus, the normal vibration caused by a rotation of the rotors and the vibration for integral multiples of the frequency of normal vibration may arise. For example, as shown in FIG. 7, peaks of the acceleration are observed in integral multiples of the frequency of the normal vibration including a frequency of 100 Hz which is two times the normal vibration in addition to the normal vibration of 50 Hz. As described above, the acceleration variations of a frequency of integral multiples of the normal vibration caused by a rotation of the rotors can be used in the life prediction of the dry pump 3.

In addition, since the clearances between the rotors 10a and 10b, or between the rotors 10a, 10b and an inner wall of the body 13 are asymmetric, the reaction by-products accumulated inside the dry pump 3 rub inhomogeneously between the rotors 10a and 10b, or between the rotors 10a, 10b and an inner wall of the body 13. As a result, sub-peaks of vibration frequency aside from frequency of the normal vibration caused by a rotation of the rotors and integral multiples of the normal vibration are observed in a frequency spectrum of acceleration measured in the accelerometers 36a, 36b when the reaction by-products are accumulated.

Figure 8:
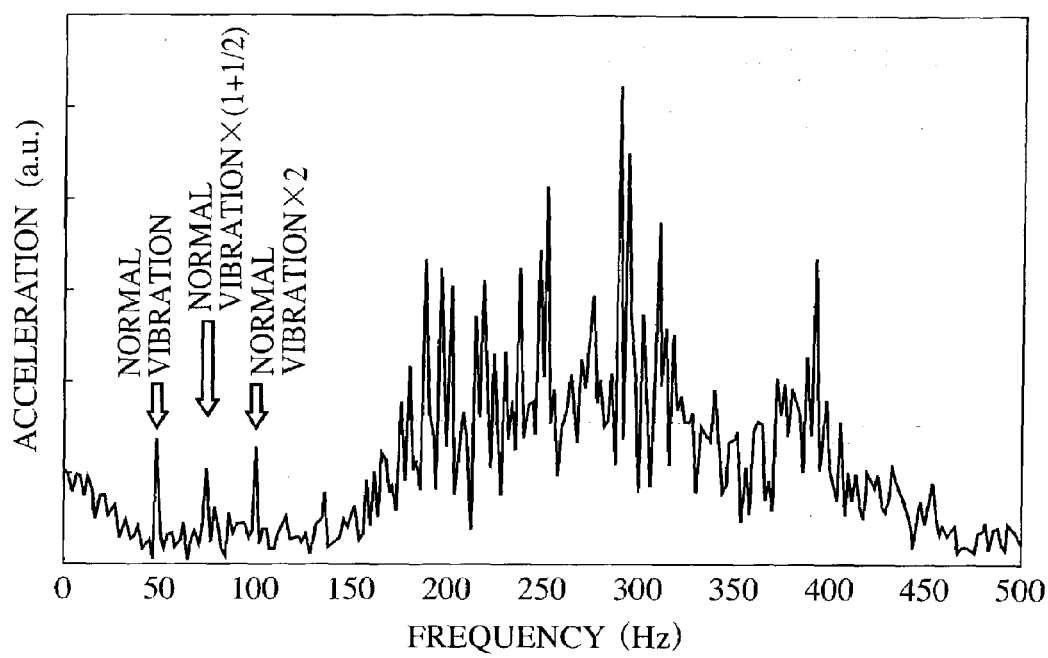
FIG. 8 is a graph showing the change over time of the peak acceleration during a film deposition step just before shutdown.

For example, as shown in FIG. 8, when the reaction by-products accumulate inside the dry pump 3 and shutdown of the dry pump 3 is imminent, a sub-peak appears in a frequency of 75 Hz that is 1.5 times of the normal vibration. On the other hand, as shown in FIG. 7, under the normal condition, the peaks of integral multiples of the frequency of the normal vibration are distinctly observed, and the sub-peaks are not clearly seen. The sub-peaks shown in FIG. 8, that appear just before shutdown, are particularly sensitive to accumulation of the reaction by-products inside the dry pump 3. The frequency of the main sub-peaks that is effective for monitoring the blockage of the reaction by-products inside the dry pump 3, is expressed by (n+l/m) times of the normal vibration, experimentally. Here, m is the number of the blades of the rotors 10a, 10b, and n, l are arbitrary positive integers. However, relation of n≦{m* [number of axis]+l } is necessary so that sensitivity deteriorates when n is large. For example, the sub-peak of the frequency of 75 Hz shown in FIG. 8 is equivalent to the case where n=1, l=1, and m=2.

Figure 9:
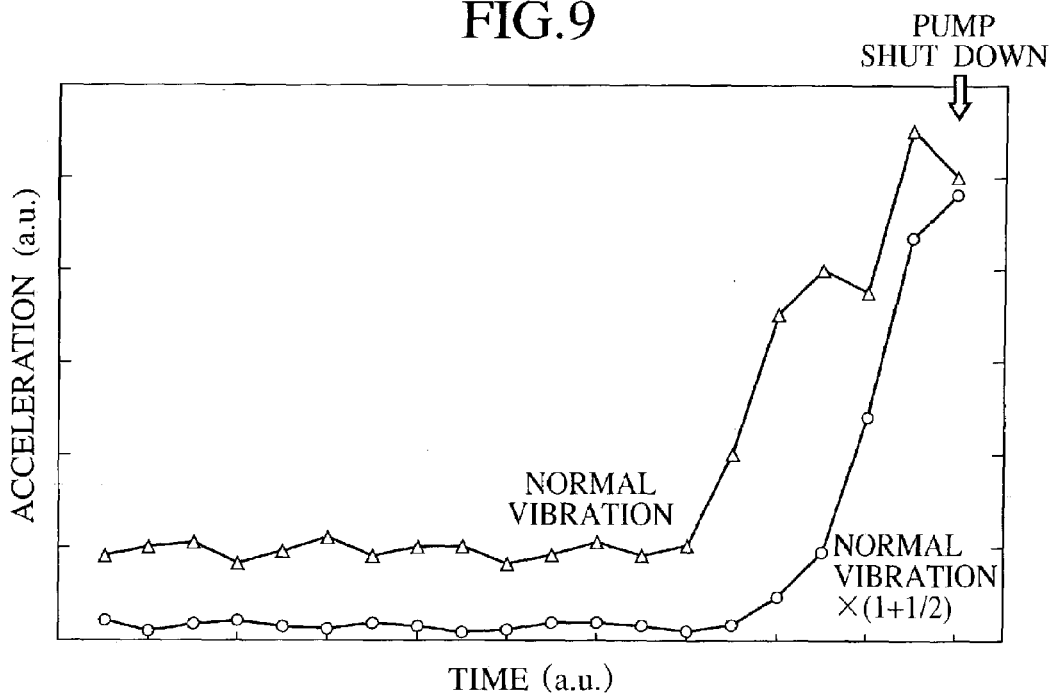
FIG. 9 is a graph showing the change over time of the peak acceleration for a normal vibration and sub-peaks during a film deposition step.

As shown in FIG. 9, the peak acceleration of the normal vibration of 50 Hz and the sub-peak of 75 Hz increase just before shutdown of the dry pump 3. In particular, because the variation rate of the peak acceleration is larger at the sub-peak of 75 Hz than the normal vibration, the blockage of the reaction products inside the dry pump 3 can be detected with higher sensitivity using the sub-peak of 75 Hz. Setting the value so that the peak acceleration become larger than 4 times from a normal value after the pump exchange, as an abnormality (the life span), and using the sub-peak of 75 Hz, the abnormality can be detected at least on the day before shutdown of the dry pump 3. Therefore, in the first embodiment of the present invention, the abnormality can be detected with high sensitivity by using the peak acceleration variation of the sub-peak.

Figure 10:
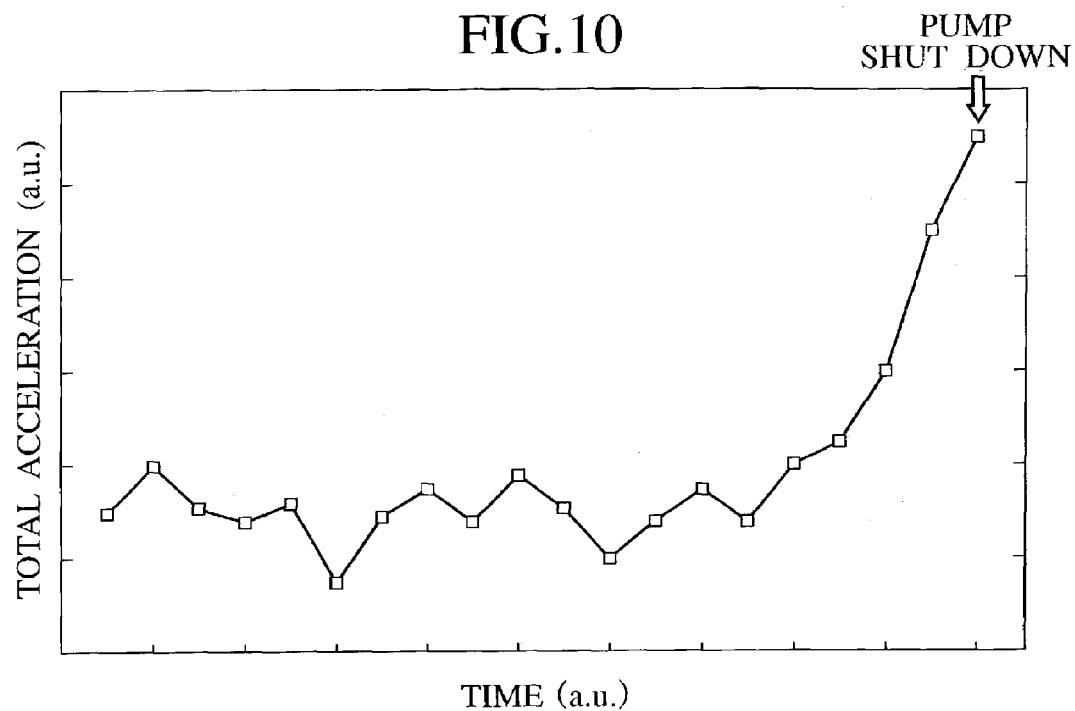
FIG. 10 is a graph showing the change over time of the total acceleration during a film deposition step.

Further, in the transition of the frequency distribution, even in a very short time, the phenomenon that the acceleration increases, for example, in the frequency range of 0 Hz to 500 Hz corresponding to 10 times the normal vibration is observed. For example, in the whole frequency range of 0 Hz to 500 Hz in FIG. 8, the acceleration increases when comparing with FIG. 7. As shown in FIG. 10, determination of the time just before shutdown of the dry pump 3 becomes possible by using a total acceleration which is an integration for the acceleration in the frequency range of 0 Hz to 500 Hz corresponding to 10 times of the normal vibration, because the total acceleration increases just before shutdown of the dry pump 3. In the case of using the total acceleration, in step S104 shown in FIG. 6, the total acceleration integrated in the frequency range of 0 Hz to 500 Hz is recorded as the diagnosis data for evaluation in a file of the system information storage unit 66. Then, the total acceleration transition determination module 62 reads out the total acceleration, compares the total acceleration with the threshold, and determines the life span of the dry pump 3. The situation where the total acceleration increase rate is at 200% or greater during the film deposition step is determined to be just before shutdown or the life span of the dry pump 3.

Second Embodiment

In a life diagnosis method of a semiconductor manufacturing apparatus according to a second embodiment of the present invention, a phase difference of the vibration is used in a failure diagnosis of the dry pump 3. The life span diagnosis method according to the second embodiment analyzes the phase difference of the vibration measured in the accelerometers 36c, 36d attached at a location near the center and the end of the dry pump 3, as shown in FIG. 5, instead of the peak acceleration variation of the vibration used in the life span diagnosis of the dry pump 3 according to the first embodiment. Since the frequency analysis device 37 analyzing time series data of the vibration and the CPU 39 predicting the life span of the dry pump 3 are similar to the first embodiment, repetitive description is omitted.

Figure 11:
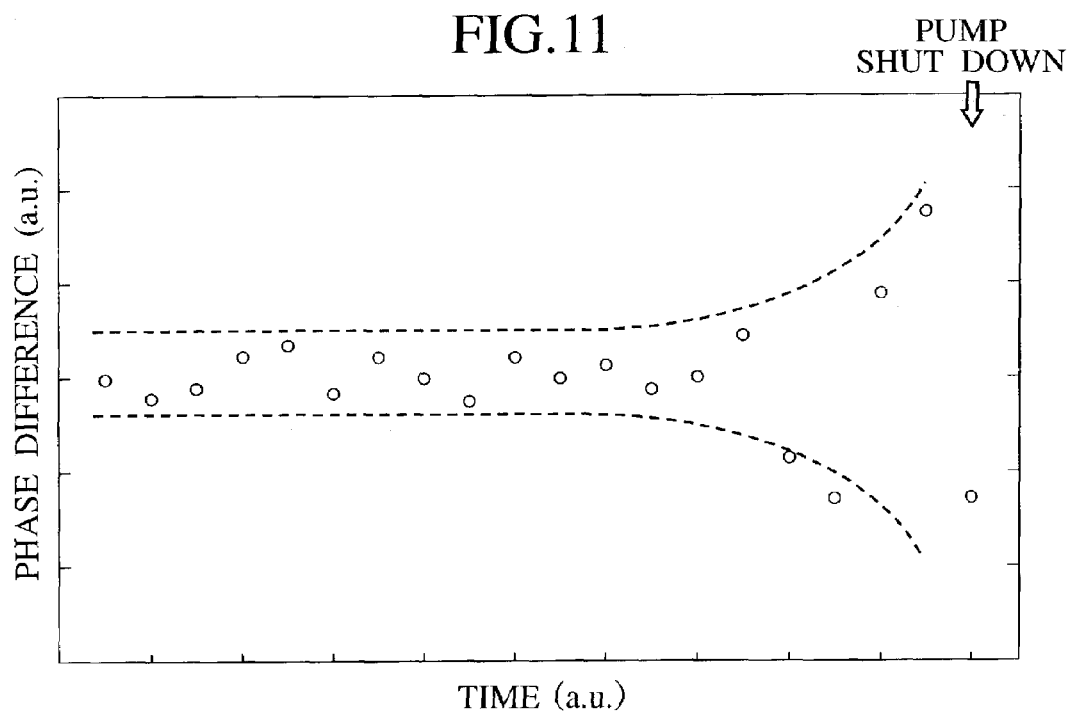
FIG. 11 is a graph showing the change over time of the phase difference of the vibration during a film deposition step.

When the reaction by-products are accumulated, clearances between the rotors 10a and 10b, or between the rotors 10a, 10b and an inner wall of the body 13, become more asymmetric. In the case of measuring the vibration with plural accelerometers attached to the dry pump 3, since the reaction by-products accumulated inside the dry pump 3 rub inhomogeneously between the rotors 10a and 10b, or between the rotors 10a, 10b and an inner wall of the body 13, the phase of the vibration observed in each of the accelerometers fluctuates. For example, the phase difference between the normal vibrations measured in accelerometers 36c, 36d during a film deposition step, is almost constant 180 degrees just after pump exchange. When the reaction by-products are accumulated inside of the dry pump 3 and shutdown of the dry pump 3 is imminent, as shown in FIG. 11, variations of the phase difference between the normal vibrations measured in accelerometers 36c, 36d during the film deposition step increase. Because an increase of the variation of the phase difference is observed when the accumulation of the reaction by-products inside of dry pump 3 increases, prediction for the time just before shutdown of the dry pump 3 can be performed efficiently with high accuracy.

In the second embodiment, the accelerometers 36c, 36d are attached at locations near the center and the end of the dry pump 3, however the accelerometers may be attached in locations where the phase difference in the vibration is observed. In addition, the accelerometers may be attached not only in two locations but more than three locations, using variations of the phase of plural vibrations for the life prediction of the dry pump 3.

Figure 12:
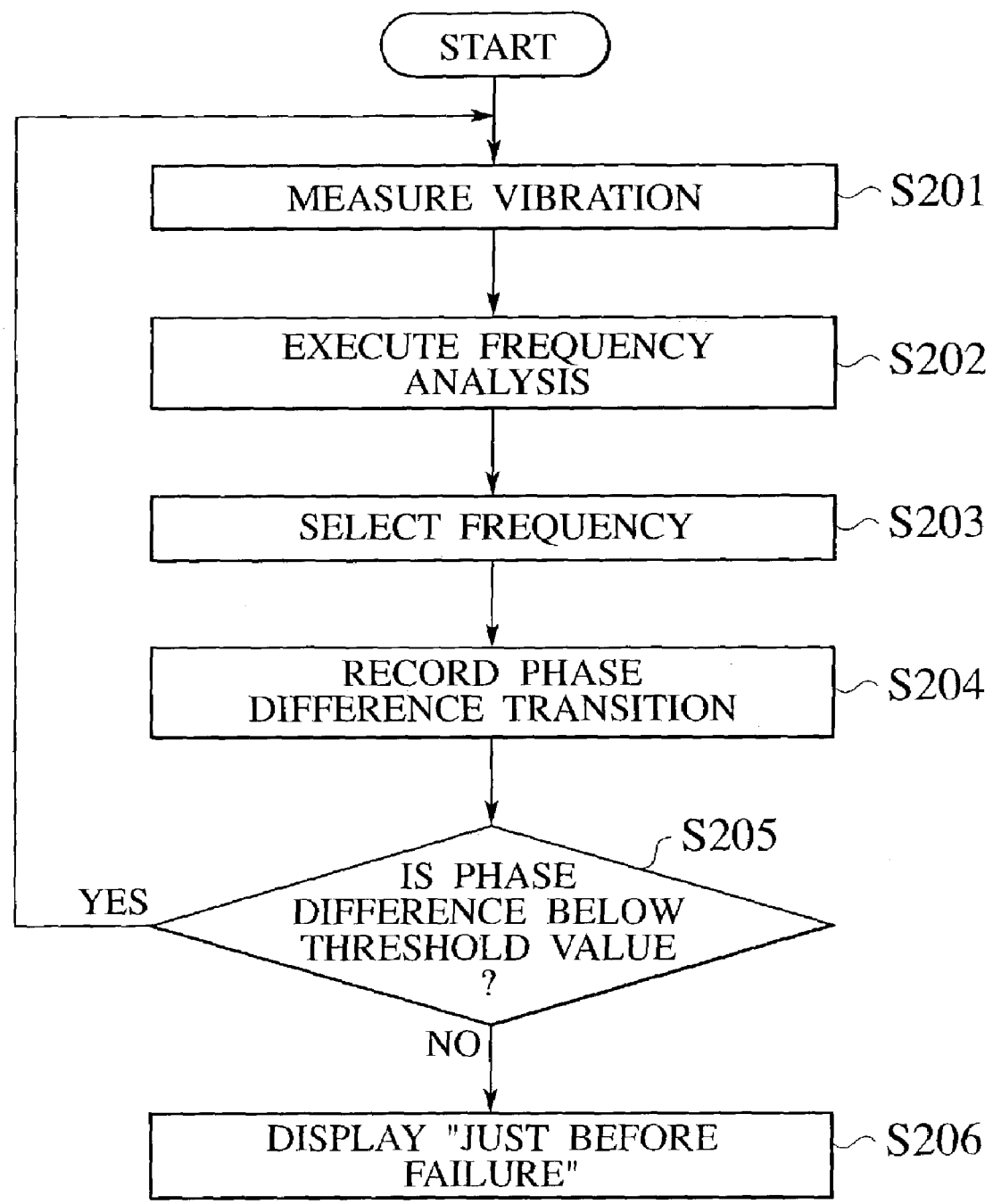
FIG. 12 is a flowchart for showing a life prediction method for a rotary machine used in the semiconductor manufacturing apparatus according to the second embodiment of the present invention.

Next, using the flowchart shown in FIG. 12, the life span prediction method for the rotary machine used in the manufacturing apparatus according to the second embodiment of the present invention is described. More specifically, the life span is predicted for the dry pump 3 utilized in the LPCVD apparatus for depositing a $Si_3N_4$ film.

(a) To begin with, in step S201, vibration (acceleration) time series data representing a transition of the dry pump 3 is sampled and measured by the accelerometers 36c, 36d attached at locations near the center and the end of the dry pump 3 of the LPCVD apparatus. For example, 4096 points of acceleration are sampled at intervals of 1 ms.

(b) Next in step S202, the vibration time series data is used to obtain a frequency spectrum of acceleration, which is decomposed into frequency components by the frequency analysis device 37.

(c) In step S203, an analysis target frequency is determined considering the frequency spectrum of acceleration using the frequency decision module 4 of the CPU 39. With the second embodiment, the analysis target frequency is given as the normal vibration of 50 Hz.

(d) Thereafter, in step S204, using the time series data recording module 5, phase difference data calculated for the normal vibrations are recorded in a file of the system information storage unit 66 as diagnosis data for evaluation.

(e) In step S205, by reading out the diagnosis data for evaluation, and comparing the diagnosis data with a threshold value, the life span of the dry pump 3 is determined by the phase difference transition determination module 63. Measurement is repeated sequentially, if the diagnosis data are below the threshold.

(f) And if the diagnosis data for evaluation exceed the threshold, in step S206, the phase difference transition determination module 63 then displays an indication on a display device or display panel, or with a display lamp attached to the LPCVD apparatus showing "just before failure (life)".

In the life span prediction method for the rotary machine used in the semiconductor manufacturing apparatus according to the second embodiment of the present invention, setting the threshold value for determining the indication of the failure appropriately, for example, with a value of 1 through 3 times of a standard deviation of the phase difference for the normal condition, the life span of the dry pump 3 may be determined with high accuracy.

Third Embodiment

Figure 13:
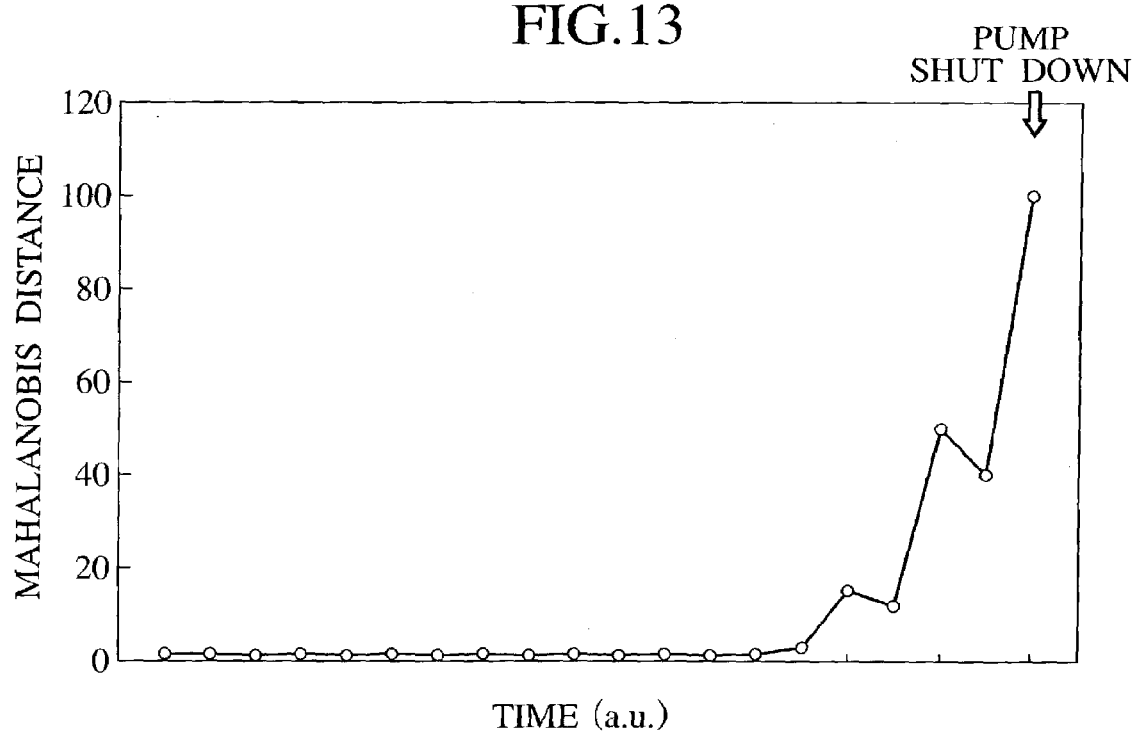
FIG. 13 is a graph showing the change over time of the MD using vibration data during a film deposition step.

In a life diagnosis method of a semiconductor manufacturing apparatus according to a third embodiment of the present invention, a MD is used in a failure diagnosis of the dry pump 3. In the third embodiment, the MD is formed with a plurality of time series data of characteristics such as the peak accelerations of the normal vibration of 50 Hz and the sub-peak of 75 Hz, the total acceleration, and the phase difference variations of vibration, used in the life span diagnosis in the first and the second embodiment. The key to apply the MD in the life span diagnosis method of the semiconductor manufacturing apparatus lies in forming a reference space (Mahalanobis space). The Mahalanobis space is set using reference time series data of the characteristics in a film deposition step of the LPCVD under the same process condition for measuring the diagnosis time series data. For example, the effects of variations in the film deposition conditions for evaluating the condition of the dry pump 3 may be eliminated by investigating the transition of changes in the MD during a three day period using time-series data for the characteristics measured three days previously as "the reference time-series data". As shown in FIG. 13, the MD increases suddenly to exceed 5 when shutdown of the dry pump 3 is imminent. Generally, MD values over 4 are determined to be abnormal. However, in empirical rules, a threshold value of the MD for the life span determination is set with a value in the range of 5 through 10. In the third embodiment, threshold value of the MD is set as 5. Then, the situation when the MD value exceeds the threshold value of 5, is determined to be an indication of imminent shutdown of the dry pump 3. In addition, the Mahalanobis space may be set using not only the above mentioned characteristics, but also time-series data such as motor current, motor voltage, motor power, pressure in the dry pump 3, temperature of the dry pump 3, and the like.

Figure 14:
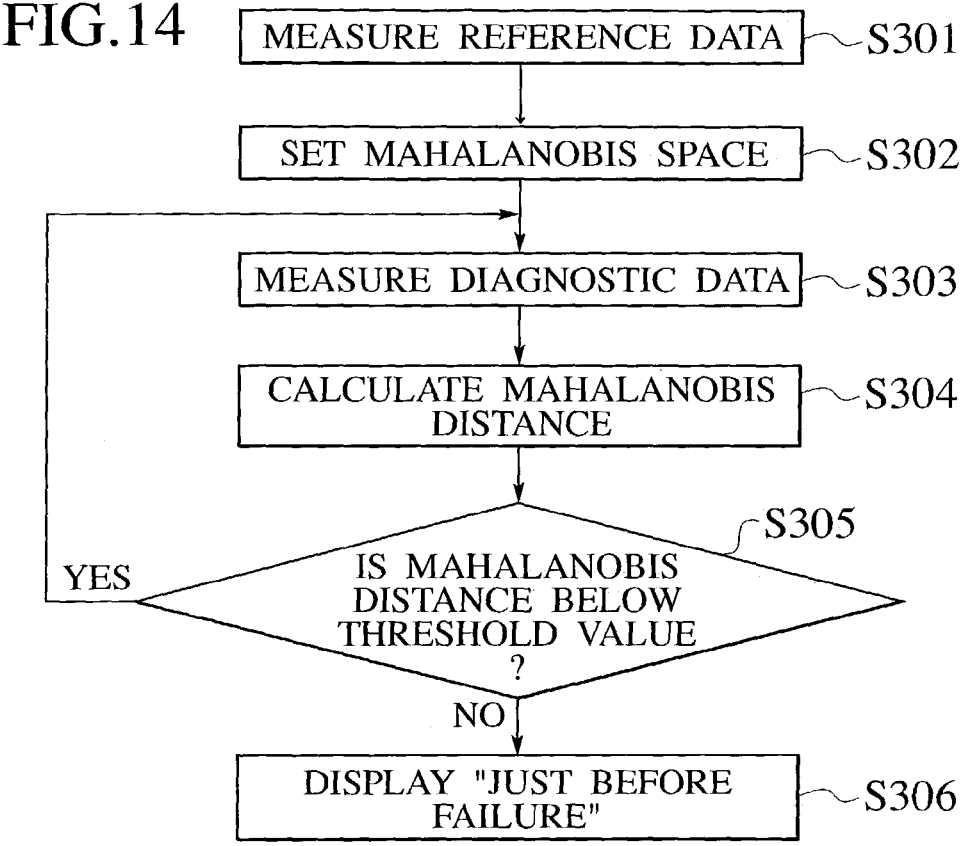
FIG. 14 is a flowchart for showing a life prediction method for a rotary machine used in the semiconductor manufacturing apparatus according to the third embodiment of the present invention.

Next, using the flowchart shown in FIG. 14, the life prediction method for the dry pump 3 used in the LPCVD apparatus according to the third embodiment of the present invention is described.

(a) To begin with, in Step S301, at a predetermined time before the time where measurement starts for diagnosis time series data of the characteristics of the dry pump 3, reference time series data are measured under same process conditions for measuring the diagnosis time series data.

(b) Next, in Step S302, frequency analysis is performed for the reference time series data to generate reference data based on variations in characteristics of the vibrations corresponding to the analysis target frequency and the Mahalanobis space is set based on the reference data. More specifically, the inverse matrix of the correlation matrix derived from the reference data set of the peak acceleration of the normal vibration of 50 Hz and the sub-peak of 75 Hz, the total acceleration, the phase difference variations of vibration, and the like, is determined. Calculation of the inverse matrix of the correlation matrix is performed with the MD determination module 64 in the CPU 39 shown in FIG. 1. The calculated Mahalanobis space is stored in the system information storage unit 66.

(c) In Step S303, characteristics data for the diagnosis time series data, such as the peak acceleration of the normal vibration of 50 Hz and the sub-peak of 75 Hz, the total acceleration, the phase difference variations of vibration, and the like, are then measured for three days.

(d) Then, in Step S304, frequency analysis is performed for the diagnosis time series data to generate diagnosis data based on variations in characteristics of the vibrations corresponding to the analysis target frequency and a variation of the MD over the time of the three days is determined using the diagnosis data and the Mahalanobis space. Calculation of the MD is performed by the MD determination module 64 using the Mahalanobis space data stored in the system information storage unit 66.

(e) In step S305, the MD calculated by the MD determination module 64 is compared with the threshold value. If the calculated MD is below the threshold, measurement is repeated sequentially, and a new calculation of the MD is performed.

(f) And if the calculated MD exceeds the threshold, in step S306, the MD determination module 64 then displays an indication on a display device or display panel, or with a display lamp attached to the LPCVD apparatus showing "just before failure (life)".

In the life span prediction method for the dry pump 3 used in the LPCVD apparatus according to the third embodiment of the present invention, the indication of failure and the life span of the dry pump 3 can be determined with high sensitivity, stability and accuracy.

Other Embodiments

The present invention has been described as mentioned above, however the descriptions and drawings that constitute a portion of this disclosure should not be perceived as limiting this invention. Various alternative embodiments and operational techniques will become clear to persons skilled in the art from this disclosure In the first embodiment of the present invention, the accelerometers 36a, 36b are attached to a front surface and a rear surface in the central part of the dry pump 3, however, a front surface and a rear surface at the end of the dry pump 3 are also allowable. In addition, the accelerometers 36a, 36b may be located on a top surface, a side surface, or a bottom surface of a gearbox (not shown in the figures) of the dry pump 3. An attaching face of the dry pump 3 or the gearbox may be polished with machine precision to be the same as an attaching face of accelerometers, in order to assure stability of the acceleration measurement.

In addition, in the descriptions of the first through third embodiments of the present invention, a Roots-type dry pump 3 is illustrated as an example of a rotary machine, however, it has been verified that similar results may be obtained with a screw-type dry pump. Using the sub-peak with a frequency of (n+1 /m) times of the normal vibration, and the number of the blades, m may set as 1 for the screw-type dry pump.

Figure 15:
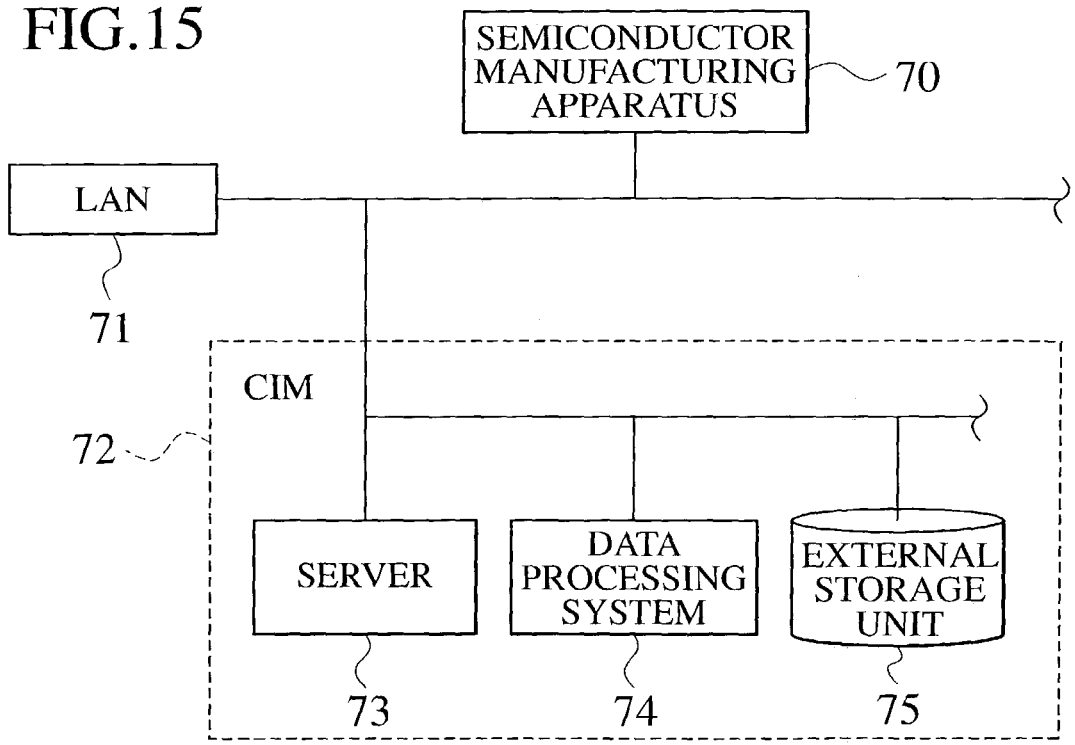
FIG. 15 is a block diagram showing a structural example of a semiconductor manufacturing system performing life prediction of a rotary machine according to another embodiment of the present invention.

In addition, in the first through third embodiments of the present invention, the analysis for predicting the life span of the dry pump 3 is performed by the life prediction unit 6 of the CPU 39 attached to the LPCVD apparatus, however, the life prediction analysis may be performed by another computer in the LPCVD apparatus. For example, it may be embedded in a controller (not shown in the figures) of the dry pump 3. Furthermore, as shown in FIG. 15, a semiconductor manufacturing system according to another embodiment of the present invention provides a semiconductor manufacturing apparatus 70 and a computer integrated manufacturing system (CIM) 72 and the like connected to a local area network (LAN) 71. The CIM 72 has a server 73, a data processing system 74 and an external storage unit 75 and the like connected thereto. The life span determination analysis may also be performed by the data processing system 74 on the CIM 72 by transmitting measured time-series data via the LAN 71. Furthermore, the life span determination analysis may also be performed by the server 73 or another computer on the CIM 72. Moreover, storing the time-series data for the characteristics used in the life span determination analysis in the external storage unit 75 on the CIM 72 is also permissible.

Furthermore, in the above description, the case where a $Si_3N_4$ film is deposited through a reaction of $SiH_2Cl_2$ gas and $NH_3$ gas is given, however, naturally, source gases are not limited to $SiH_2Cl_2$ gas and $NH_3$ gas. For example, hexachlorodisilane $(Si_2Cl_6)$ gas and the like may be used instead of $SiH_2Cl_2$ gas. In addition, the example of LPCVD for $Si_3N_4$ film should not be construed as limiting; LPCVD for thin films with other materials is similarly applicable. In addition, an example where a single type of thin film is grown is shown, however, similar effects may be obtained in the case of forming a thin film having a plurality of species, such as a $SiO_2$ film, TEOS oxide film, and polycrystalline silicon with the same LPCVD apparatus.

Moreover, it should be noted that an example of an LPCVD process is illustrated in the first through third embodiments of the present invention. In the present invention similar results have been confirmed in the case where the reaction by-product is deposited inside the dry pump resulting in the pump shutting down and may be applicable to CVD processes in general and to other processes such as the dry etching process.

Various modifications will become possible for those skilled in the art after receiving the teachings of the present disclosure without departing from the scope thereof.

What is claimed is:

1. A manufacturing apparatus which includes a rotary machine, comprising:
    a plurality of accelerometers, configured to measure diagnosis time series data of vibrations of the rotary machine, attached to the rotary machine at locations where variations in the vibrations are different;

a frequency analysis device configured to perform a frequency analysis on the diagnosis time series data measured by the plurality of accelerometers;

a time series data recording module configured to generate diagnosis data from the analyzed diagnosis time series data based on variations in characteristics of the vibrations corresponding to an analysis target frequency and to record the diagnosis data, the analysis target frequency being expressed as a product of an equation including a reciprocal number of rotor blades of the rotary machine and a normal frequency unique to the rotary machine, the equation including the reciprocal number of the rotor blades expressed as n+(l/m), where m is the number of the blades, and n, l are arbitrary positive integers; and a life prediction unit configured to analyze the diagnosis data to determine a life span of the rotary machine.

2. The manufacturing apparatus of claim 1, wherein the plurality of accelerometers are attached to a first surface of the rotary machine and a second surface of the rotary machine facing to the first surface.

3. The manufacturing apparatus of claim 1, wherein the plurality of accelerometers are attached to locations where phases of the variations in the vibrations of the rotary machine are different.

4. The manufacturing apparatus of claim 3, wherein the plurality of accelerometers are attached to locations near a center of the rotary machine and an end of the rotary machine.

5. The manufacturing apparatus of claim 1, wherein the life prediction unit includes an acceleration transition determination module using a peak acceleration as a characteristic of the diagnosis data.

6. The manufacturing apparatus of claim 1, wherein the equation including the reciprocal number of blades is expressed as [1+(1/m)].

7. The manufacturing apparatus of claim 1, wherein the life prediction unit includes a Mahalanobis distance determination module setting a Mahalanobis space based on reference time series data measured under process conditions which are the same process conditions for measuring the diagnosis time series data, at a time determined by empirical rules prior to a time to measure the diagnosis time series data and predicting a life span using a Mahalanobis distance calculated from the diagnosis data based on the Mahalanobis space.

8. The manufacturing apparatus of claim 1, wherein the characteristics of the vibrations are peak accelerations of the vibrations.

9. A method for predicting life of a manufacturing apparatus which includes a rotary machine, comprising:

implementing a manufacturing process under process conditions in the manufacturing apparatus;

measuring diagnosis time series data of vibrations of the rotary machine in a plurality of locations where variations in the vibrations are different;

generating first diagnosis data based on variations in characteristics of the vibrations corresponding to an analysis target frequency by performing a frequency analysis for the diagnosis time series data, the analysis target frequency being expressed as a product of an equation including a reciprocal number of rotor blades of the rotary machine and a normal frequency unique to the rotary machine, the equation including the reciprocal number of blades expressed as n+(l/m), where m is the number of the rotor blades, and n, l are arbitrary positive integers; and determining a life span of the rotary machine using the first diagnosis data.

10. The method of claim 9, wherein the equation including the reciprocal number of blades is expressed as [1+(1/m)].

11. The method of claim 9, wherein the characteristics of the vibrations are peak accelerations of the vibrations.

12. The method of claim 9, wherein the plurality of locations are a first surface of the rotary machine and a second surface of the rotary machine facing to the first surface.

13. The method of claim 9, wherein the plurality of locations are locations where phases of the variations in the vibrations of the rotary machine are different.

14. The method of claim 13, wherein the plurality of locations are near a center of the rotary machine and an end of the rotary machine.

15. The method of claim 9, further comprising:

measuring reference time series data including a plurality of time series data characteristics;

generating reference data based on variations in the time series data characteristics, and setting a Mahalanobis space based on the reference data; and determining the life span of the rotary machine using a Mahalanobis distance calculated from the first diagnosis data based on the Mahalanobis space.

16. The method of claim 15, wherein the reference time series data are measured for the same process conditions as the diagnosis time series data, prior to a time to measure the diagnosis time series data.

* * * * *